(12) United States Patent
Wu

(10) Patent No.: US 7,686,028 B2
(45) Date of Patent: Mar. 30, 2010

(54) STRUCTURE OF STRAIGHT-OUT CONTROLLABLE CERAMIC VALVE OF ANTI-FREEZING FAUCET

(76) Inventor: Hung-Neng Wu, No.81-1, Goucian Lane, Lugang Township, Changhua County 50567 (TW)

( * ) Notice: Subject to any disclaimer, the term of this patent is extended or adjusted under 35 U.S.C. 154(b) by 0 days.

(21) Appl. No.: 11/600,900

(22) Filed: Nov. 17, 2006

(65) Prior Publication Data
US 2008/0115835 A1 May 22, 2008

(51) Int. Cl.
*E03B 7/12* (2006.01)
(52) U.S. Cl. .............. 137/59; 137/301; 137/454.5; 137/360
(58) Field of Classification Search .......... 137/59, 137/454.5, 454.6, 625.31, 301, 360
See application file for complete search history.

(56) References Cited

U.S. PATENT DOCUMENTS

| 5,392,805 | A |   | 2/1995 | Chrysler | 137/625.31 |
|---|---|---|---|---|---|
| 5,924,676 | A | * | 7/1999 | Cook et al. | 137/454.5 |
| 6,247,496 | B1 |   | 6/2001 | Ko | 137/625.31 |
| 6,279,605 | B1 | * | 8/2001 | Wang | 137/454.6 |
| 6,880,573 | B2 | * | 4/2005 | Berkman et al. | 137/454.5 |

* cited by examiner

*Primary Examiner*—Kevin L Lee
(74) *Attorney, Agent, or Firm*—Jackson IPG PLLC

(57) ABSTRACT

An improved structure of straight-out controllable ceramic valve of anti-freezing faucet, which is comprised by cover water-receiving valve seat with open bottom, cylinder water-controlling shaft bolt that one end is covered into shaft hole at center of water-receiving valve seat and a plurality of butterfly outlet control valves, wherein bottom of water-controlling shaft bolt has a protruding tongue embedding into top of bottom butterfly porcelain shard in order to adjust outlets of top and bottom porcelain shard; its features are as follows: an inlet channel extending to middle section of shaft bolt is made at middle section of bottom of water-controlling shaft bolt, horizontal through outlet channel is made at two sides of inlet channel. This straight-out water supply channel structure, because of ceramic valve of top porcelain shard, water can directly flow upward into inlet channel at middle section of the continuous shaft bolt when outlet of bottom porcelain shard is not closed properly, and then enter into pipe of faucet from outlet set around shaft hole at top of cover water-receiving valve seat via horizontal through outlet channel, so that this straight-out channel can supply water directly, no reduction of hydraulic pressure during supplying because of curve of water channel.

2 Claims, 3 Drawing Sheets

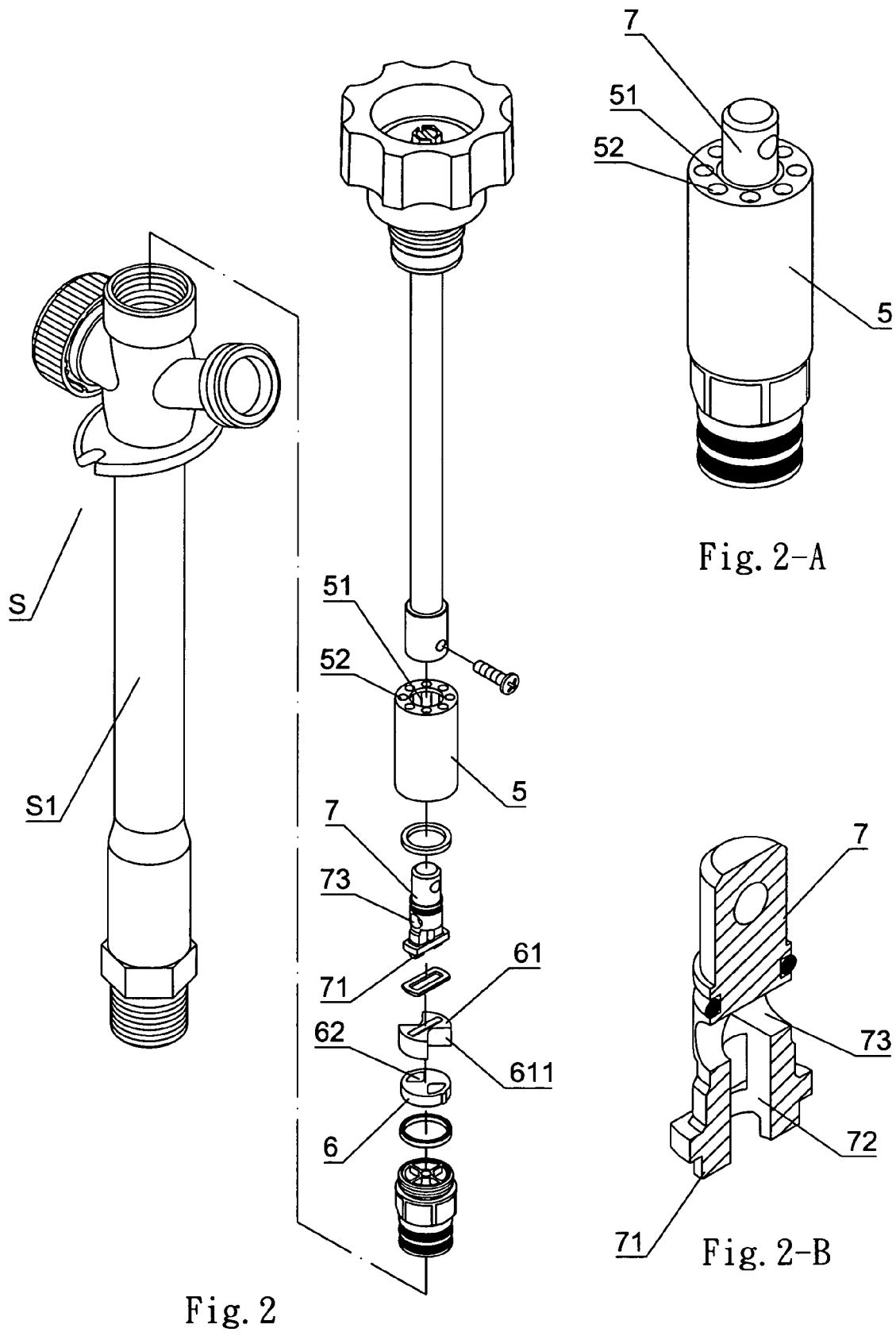

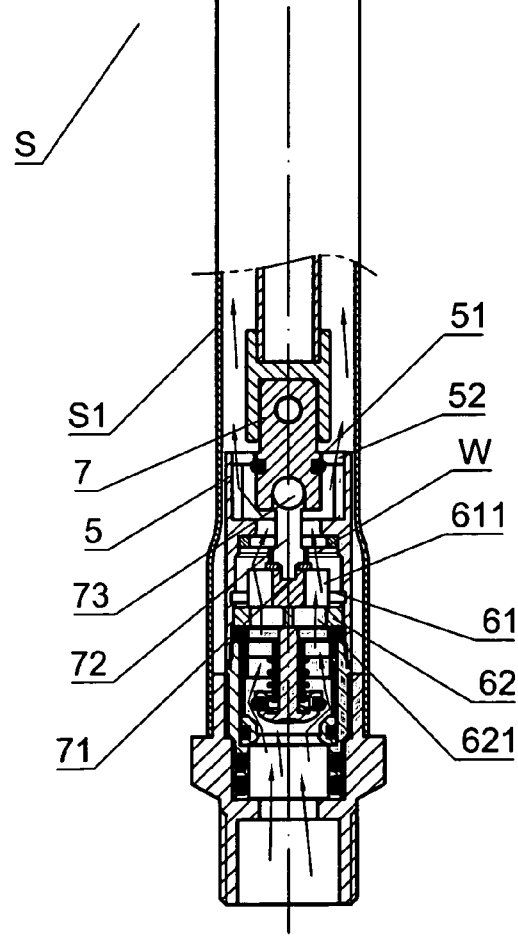
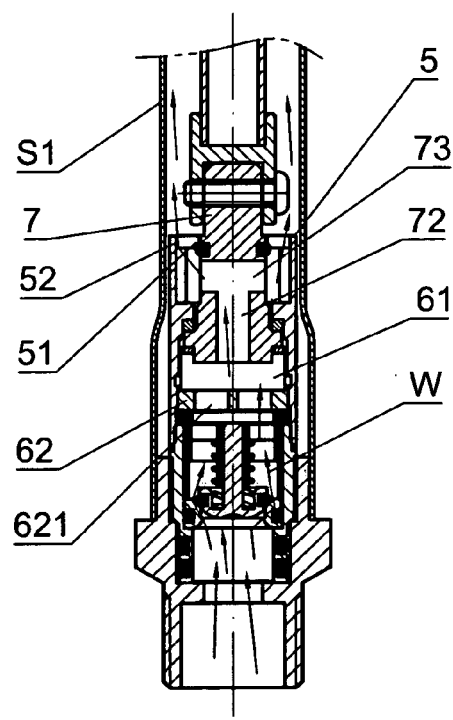
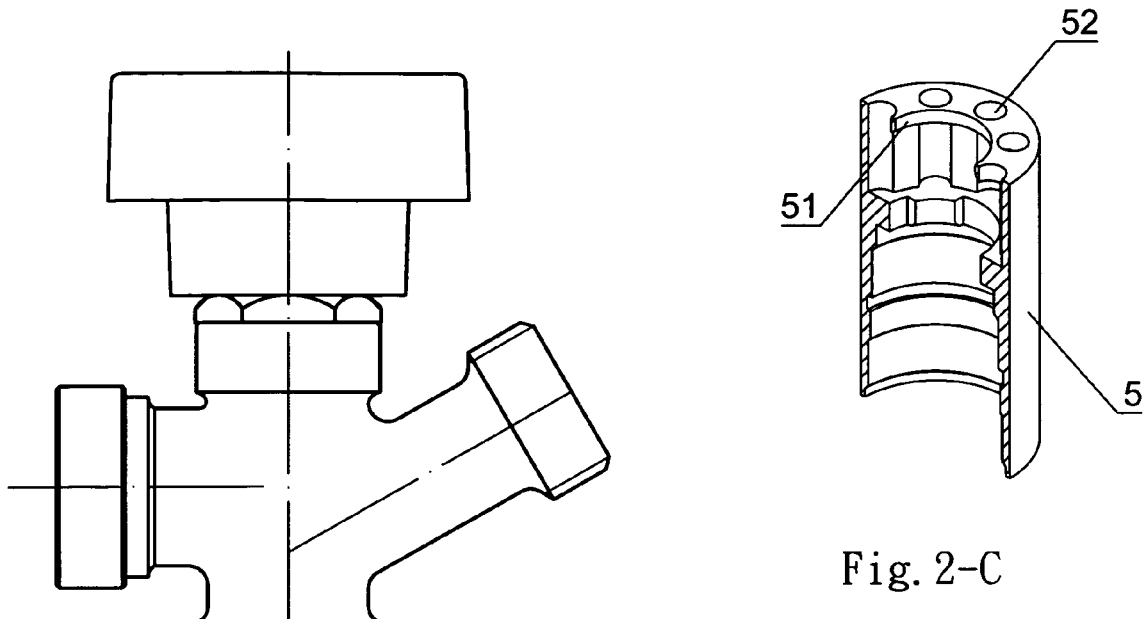
Fig. 2-C
Fig. 3-A
Fig. 3-B

STRUCTURE OF STRAIGHT-OUT CONTROLLABLE CERAMIC VALVE OF ANTI-FREEZING FAUCET

BACKGROUND OF THE INVENTION

1) Field of the Invention

This invention relates to an improved structure of straight-out controllable ceramic valve of anti-freezing faucet, which is to set an inlet channel extending to middle section of shaft bolt from bottom to upward at middle section of bottom of water-controlling shaft bolt in water-receiving valve seat, and horizontal through outlet channel is also set at two sides of inlet channel so that water in ceramic valve can directly flow upward and enter into inlet channel at middle section of shaft bolt, and then, flow into water pipe of faucet from outlets set around top of water-receiving valve, therefore, such faucet can supply water smoothly without reduction of hydraulic pressure.

2) Description of the Prior Art

In recent years, the outdoor anti-freezing faucet connected out from ground has been equipped with ceramic valve instead of the traditional check copper bolt as control components to adjust water supply (please refer to FIG. 1), which is comprised by cover water-receiving valve seat 2 with outlet 21 at its side and cylinder water-controlling shaft bolt 3 with a protruding tongue 31 at bottom to embed into top of side-out top porcelain shard 41 so as to aim at outlet 411, 421 of top and bottom porcelain shard 41 &42 for adjustment, meanwhile, its top is covered into shaft hole 22 at middle section of top of water-receiving valve seat 2; when outlet 421 of bottom porcelain shard 42 is not aimed at and closed, water may flow out outlet 411 of top porcelain shard 41 and then flow upward, after pass through side of water-controlling shaft bolt 3, water flow out outlet 21 of water-receiving valve seat 2 and then turn upward, finally, enter into water pipe S of faucet S to flow out. Thus, water must pass through several right angles of channel during adjusting, hydraulic pressure may be reduced, so that water can not flow out smoothly, therefore, such structure is required to get improved.

SUMMARY OF THE INVENTION

Object of this invention is to provide an improved structure of ceramic valve of anti-freezing faucet; wherein an inlet channel extending to middle section of shaft bolt from bottom to upward is made at middle section of bottom of water-controlling shaft bolt in a cover water-receiving valve seat, and horizontal through outlet channel is also set at two sides of inlet channel so that water in ceramic valve can directly flow upward and enter into inlet channel at middle section of shaft bolt, and then, flow into water pipe of faucet from outlets set around top of water-receiving valve, therefore, such faucet can supply water smoothly without reduction of hydraulic pressure and water flow.

BRIEF DESCRIPTION OF THE DRAWINGS

FIG. 2 is the exploded view of structure of this invention.
FIG. 2-A is the exploded combination view of structure of this invention.
FIG. 2-B is the exploded half section view of cover water-receiving valve seat.
FIG. 2-C is the exploded half section view of water-controlling shaft bolt.
FIG. 3-A is the outlet section view of structure of this invention.
FIG. 3-B is another outlet section view of structure of this invention.

DETAILED DESCRIPTION OF THE PREFERRED EMBODIMENTS

Figure 1:
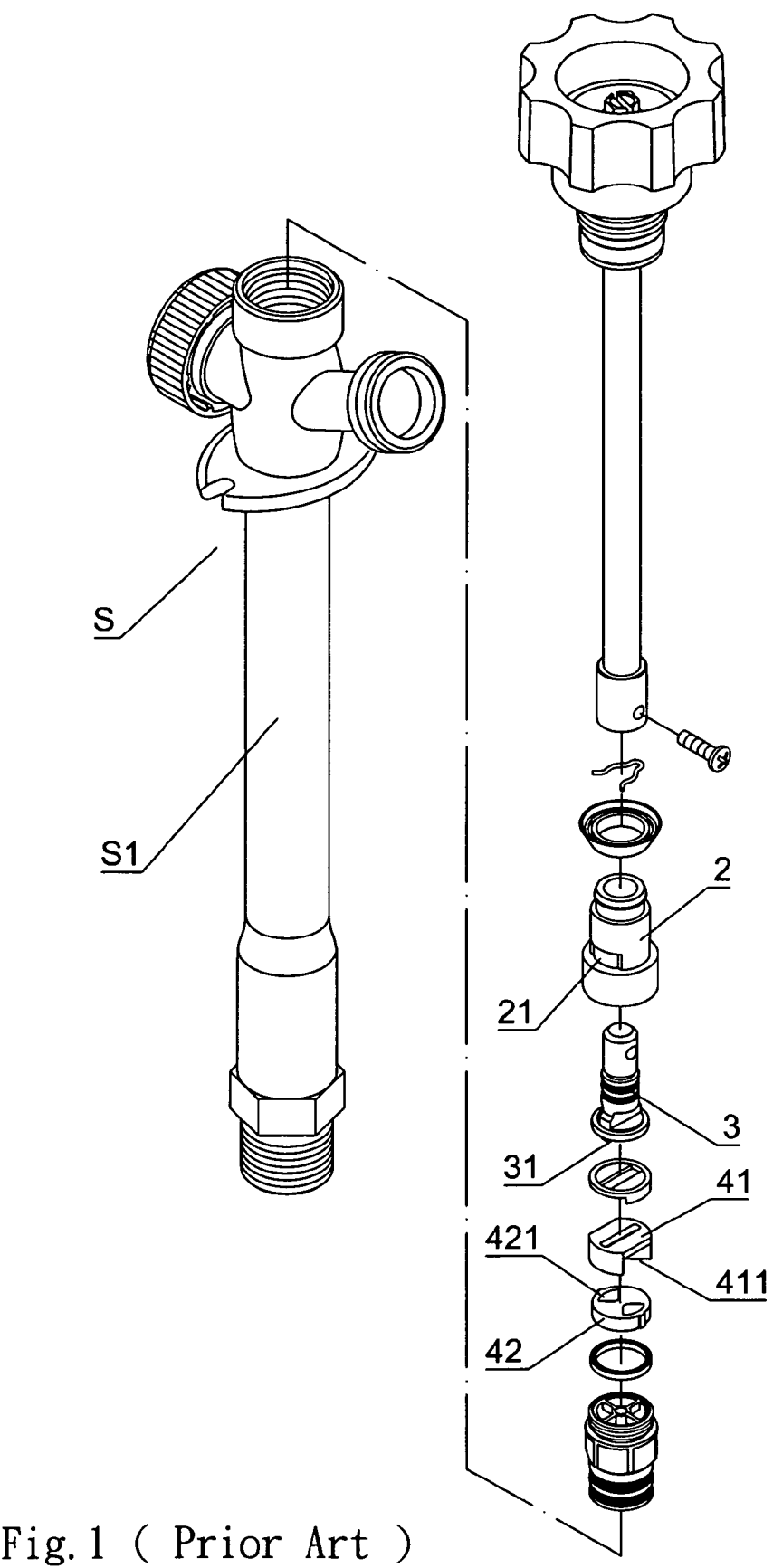
FIG. 1 is the exploded view of ceramic valve of prior anti-freezing faucet.

The preferred embodiments and examples of this invention are hereby described with drawings in the following, and please first refer to FIG. 2, FIG. 2-A, FIG. 2-B and FIG. 2-C.

This invention is comprised by cover water-receiving valve seat with open bottom 5, cylinder water-controlling shaft bolt 7 that one end is covered into shaft hole at center of water-receiving valve seat and a plurality of butterfly outlet control valves, wherein bottom of water-controlling shaft bolt has a protruding tongue 61 embedding into top of bottom butterfly porcelain shard 61 (i.e., a "shard" being a water flow adjusting piece of a valve) in order to adjust outlets of top and bottom porcelain shard; its features are as follows: inlet channel 72 extending to middle section of shaft bolt 7 is made at middle section of bottom of water-controlling shaft bolt 7 and horizontal through outlet channel 73 is also set at two sides of in let channel 72.

Please refer to FIG. 3-A and FIG. 3-B, this straight-out water supply channel structure, because of ceramic valve 6 of top porcelain shard 61, water W can directly flow upward and pass continuously through inlet channel 72 at middle section of shaft bolt 7 when outlet 621 of bottom porcelain 6 is not aimed at and closed properly, and then enter into pipe S1 of faucet S from outlet 52 set around shaft hole 51 at top of cover water-receiving valve seat 5 via horizontal through outlet channel 73, so that this straight-out channel can supply water directly, no reduction of hydraulic pressure and water flow during supplying To sum up all above descriptions, this invention can indeed ensure the anti-freezing faucet to supply water properly in high flow, so, it is in conformity with a new patent.

What is claimed is:

1. A straight-out controllable ceramic valve of an anti-freezing faucet, comprising:
   a cover water-receiving valve seat having an open bottom and a plurality of seat outlets spaced around a shaft hole at a top of the cover water-receiving valve seat;
   a cylindrical water-controlling shaft bolt having one end contained within a shaft hole at a center of the water-receiving valve seat;
   a vertical inlet channel extending through the shaft bolt to a middle section of the shaft bolt;
   a horizontal through outlet channel located at the middle section of the shaft bolt, the horizontal through outlet channel being in fluid communication with the vertical inlet channel; and
   a plurality of butterfly outlet control valves including a bottom butterfly porcelain shard and a top porcelain shard, a bottom of the water-controlling shaft bolt having a protruding tongue embedded into a top of the bottom porcelain shard to adjust the alignment of outlets of the top porcelain shard relative to outlets of the bottom porcelain shard,
   wherein the top porcelain shard is configured to route water to directly flow upward into the inlet channel of the middle section of the shaft bolt and upwards through the seat outlets when the outlets of the bottom porcelain shard are aligned with the outlets of top porcelain shard with substantially no reduction in hydraulic pressure.

2. The straight-out controllable ceramic valve of the anti-freezing faucet according to claim 1, wherein the seat outlets are a plurality of circular outlets spaced around the perimeter of the shaft hole to allow the upward flow of water through the seat outlets with substantially no reduction in hydraulic pressure.

\* \* \* \* \*